Figure 1:
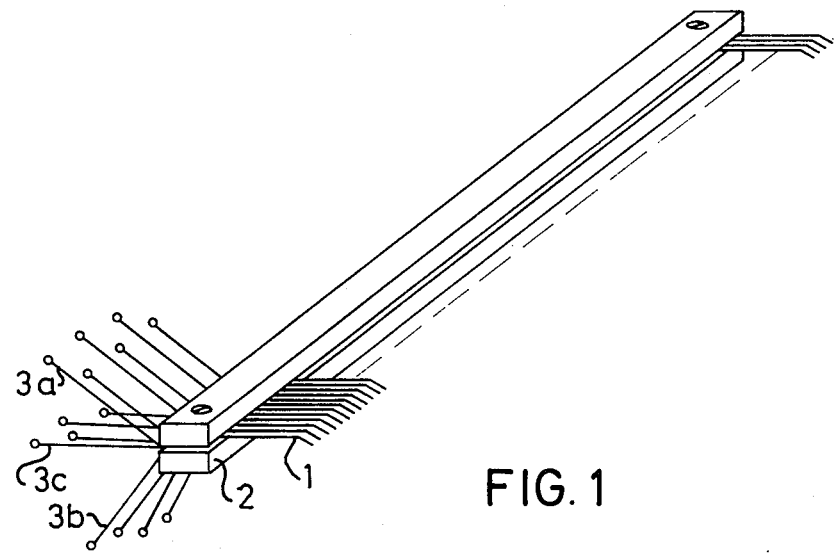

United States Patent [19]
Christensen

[11] 3,994,062
[45] Nov. 30, 1976

[54] METHOD FOR MANUFACTURING AN ELECTRODE SET FOR USE IN THE RECORDING ON A RECORD CARRIER

[76] Inventor: Poul Boelt Christensen, 27 Finnjollevej, Jyllinge pr. 4000 Roskilde, Denmark

[22] Filed: May 28, 1975

[21] Appl. No.: 581,597

[30] Foreign Application Priority Data
May 31, 1974 Denmark.............................. 2957/74

[52] U.S. Cl. ............................ 29/630 R; 29/203 R; 29/592; 29/630 B; 29/DIG. 16
[51] Int. Cl.²......................................... H01R 43/00
[58] Field of Search............ 29/203 J, 203 P, 203 R, 29/630 R, 630 B, 592; 339/176 M, 176 MP

[56] References Cited
UNITED STATES PATENTS

| | | | |
|---|---|---|---|
| 3,042,999 | 7/1962 | Page et al. | 29/630 B |
| 3,204,249 | 8/1965 | Shaler et al. | 29/592 X |
| 3,389,461 | 6/1968 | Hardardt | 29/630 R X |
| 3,765,084 | 10/1973 | Kent | 29/630 R |

*Primary Examiner*—Victor A. DiPalma
*Attorney, Agent, or Firm*—Beveridge, DeGrandi, Kline & Lunsford

[57] ABSTRACT

An electrode set for use in a recording apparatus and comprising a row of substantially wire-shaped electrode pins projecting freely coplanar and parallel to each other from a common carrier and being provided with integral connecting terminals for the supply of selective actuation signals, is manufactured by etching a number of plate-shaped blanks of the electrode material, so that each of them produces a number of electrode pins, the spacings between which are at least equal to the thickness of the blank after which the blanks are bent in different direction along bending lines at right angles to the electrode pins and are coupled together under mutual parallel displacement by means of a special tool, so that each spacing between adjacent electrode pins in one blank will accommodate in the same plane one electrode pin from each of the remaining blanks, the resulting spacing between the electrode pins being essentially smaller than the thickness of the electrode pins.

3 Claims, 6 Drawing Figures

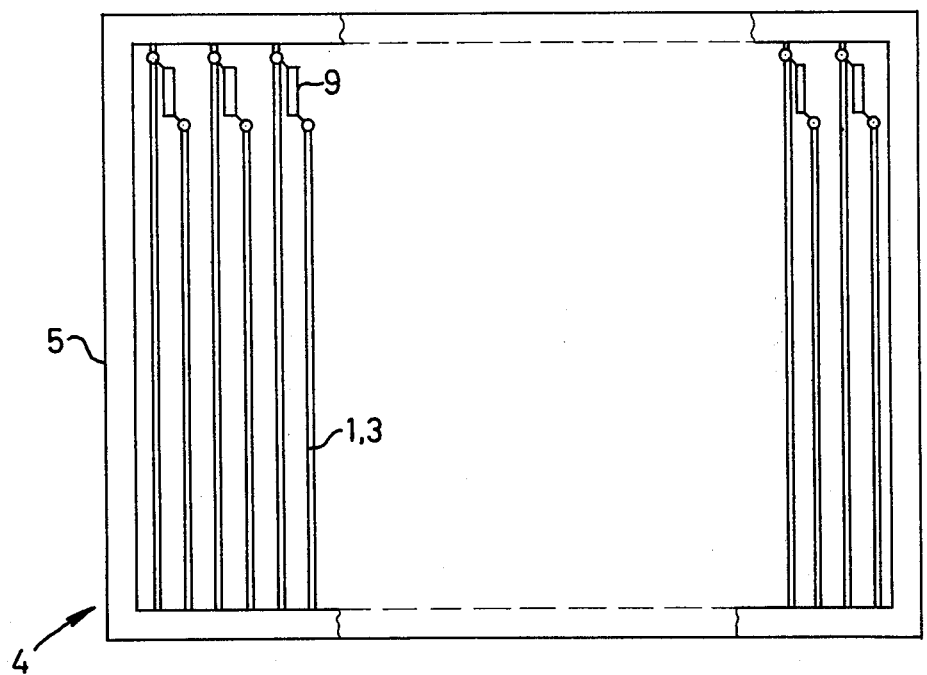
FIG. 4
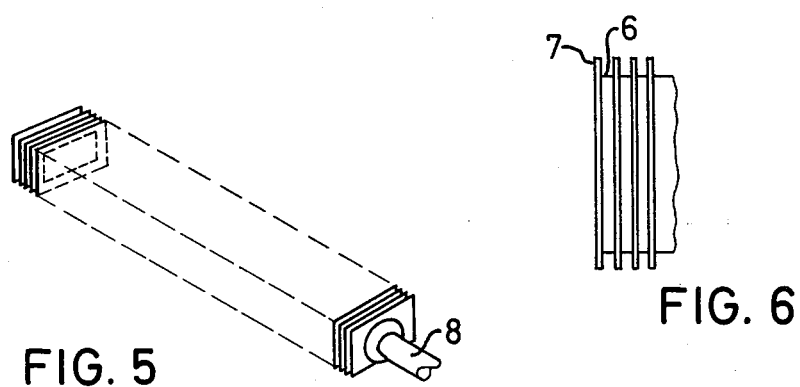
FIG. 5
FIG. 6

METHOD FOR MANUFACTURING AN ELECTRODE SET FOR USE IN THE RECORDING ON A RECORD CARRIER

The invention relates to a method for manufacturing an electrode set for use in the recording on a record carrier, in which electrode set a row of substantially wire-shaped electrode pins project freely from a common carrier parallel to each other and side by side in a common plane, said pins being connected to individual ones of a number of connecting terminals for control lines for the supply of actuating signals for the selective actuation of each electrode pin independently of the remaining electrodes, the thickness of the electrode pins at right angles to the common plane being substantially larger than the spacing between two electrode pins.

Such an electrode set may for example be employed in a recording apparatus for analog electric signals of the type where signal waveforms are recorded on a record carrier in the form of e.g. a web of metallized paper by means of an electrode set comprising a large number of stationary electrode pins which are located in a row at right angles to the direction of advance of the record carrier and are supplied with selective actuation signals from a decoder which is supplied with digital signal values obtained by an analog-to-digital conversion of the supplied analog signal which it be desired to record.

In order that the greatest possible continuity of the recording of the signal waveform may be achieved, care must be taken that the individual electrode pins in the electrode set have the smallest possible width and are located as closely to each other as possible. On the other hand, the actuation voltage necessary for actuating the record carrier, which is blackened by spark breakdown from the electrode pins, and the regard to the obtainment of the necessary rigidity of the electrode pins require a certain minimum cross-section of the individual electrode pins. Since the electrode pins have to be connected separately to a control line from the decoder via a suitable connecting terminal, there will besides the wish of obtaining a close packing together of the electrode pins be the desire to have a spacing between the connecting terminals sufficiently large for avoiding short-circuits between the control lines.

Consequently, the problem is to provide an electrode set of the kind stated above, which at the same time possesses a close packing together of the electrode pins, a sufficient cross-sectional area of each electrode pin and a sufficient spacing between the individual connecting terminals for the control lines, and this in part requires that the thickness of the electrode pins at right angles to the common plane is essentially larger than the spacing between the electrode pins and in part makes it necessary that the connecting terminals are bent alternately in different directions, so that the spacing between mutually adjacent connecting terminals is considerably larger than the spacing between the electrode pins.

According to the invention, a method for manufacturing an electrode set of this kind is characterized in that a number of plate-shaped blanks of the electrode material and with a thickness corresponding to the thickness required of the electrode pins are etched so that each of them produces a number of parallel wire-shaped electrode pins surrounded by a common frame and each comprising its associated likewise wire-shaped connecting terminal which is integral with the electrode pin, the spacings between the electrode pins and the connecting terminals in each of the blanks being at least equal to the thickness of the blank and being so large that they offer room for accommodating an electrode pin from each of the other blanks, subsequently to which at least the total number minus one of the plate-shaped blanks thus etched are at the same distance from the extreme ends of the electrode pins bent in different directions along a bending line at right angles to the electrode pins, whereafter the surrounding frame in each of the plate-shaped blanks is removed at the side located at the extreme ends of the electrode pins, and the plate-shaped blanks are coupled together along the bending lines under mutual parallel-displacement of the blanks in the direction at right angles to the electrode pins in such a way that each spacing between adjacent electrode pins in the same blank will accommodate an electrode pin from each of the remaining blanks in the same plane as the said adjacent electrode pins and with spacings between them that are essentially smaller than the thickness of the electrode pins, and in that the common carrier is subsequently mounted parallel to the bending lines in the plate-shaped blanks, after which the remaining parts of the frames of these blanks are removed.

The use of this method provides a quick, cost-saving and simple solution to the problem, rather complicated in itself, posed by the manufacture of an electrode set having the above-mentioned desired properties which it has proved almost impossible to realize by the separate production of the individual electrode pins and the subsequent assemblage by use of more conventional mounting technique comprising the fixation of the electrode pins in the common carrying means and the soldering on of the individual control lines. The design of the electrode set with the connecting terminals for the adjacent pins bent into different directions makes it possible to shape the connecting terminals in such a way that simple plug connections between the latter and the control lines can be used so that also the incorporation of the electrode set into the apparatus in which it is to be used is simplified considerably.

In addition, the invention relates to a tool which is intended for use when the above-mentioned method is carried out and by means of which the work of assembling the plate-shaped electrode blanks into the finished electrode set with the said interdigitation of the electrode pins is facilitated consiserably.

According to the invention this tool is characterized in that it comprises a number of alternately similar plate-shaped elements which are clamped together so as to be plane-parallel and have two different sizes of area, the smaller elements being located between the larger ones and having a thickness corresponding to the width required of the electrode pins in the common plane, while the larger elements, which project beyond the smaller elements, have a thickness corresponding to the spacing between the electrode pins required for the finished electrode set.

By means of this tool, the coupling together of the plate-shaped blanks bent in advance, where the frame surrounding the electrode pins and the associated connecting terminals has been removed at the side located at the extreme ends of the electrode pins, occurs in such a way that the electrode pins in one of the plate-shaped blanks are pressed down into certain equidistantly located spacings between the large elements in the tool, whereupon the electrode pins in the next blank are pressed down into succeeding spacings in the tool and so on, until electrode pins have been pressed down into the total number of spacings between the large elements of the tool. By the electrode pins of the plate-shaped blanks being placed in the tool in such a way that the bending lines in the plate-shaped blanks are located at a suitable distance outside the tool, the possibility is created of mounting the common carrier while the ends of the electrode pins are located in the tool.

Figure 2:
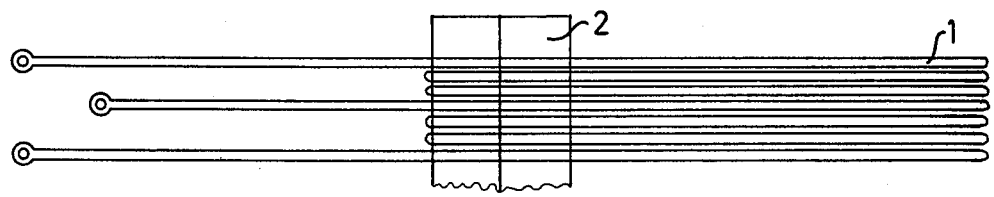
Figure 3:
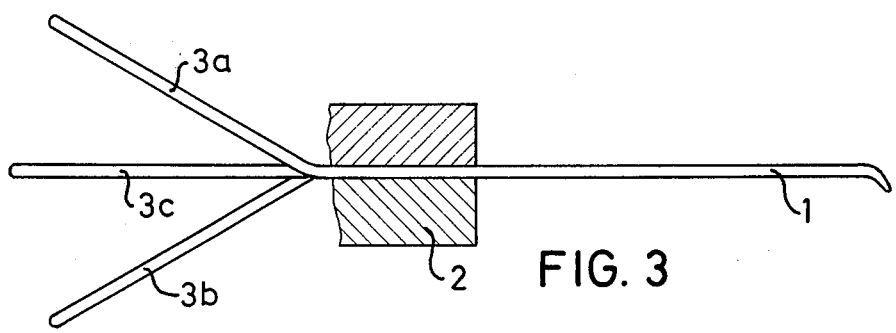

Below, the invention is explained in greater detail with reference to the drawing, in which FIG. 1 shows a perspective view of an electrode set manufactured by the method according to the invention, FIG. 2 shows an enlarged section of the electrode set in FIG. 1 in plan view, FIG. 3 shows an enlarged section of the electrode set in FIG. 1, FIG. 4 shows a plate-shaped electrode blank forming the initial material for the production of the electrode set in FIG. 1, FIG. 5 shows a tool for use in the production of the electrode set, in perspective view, and FIG. 6 shows a section of the tool in FIG. 6, viewed in side elevation.

FIG. 1 in the drawing shows an embodiment of an electrode set according to the invention intended for use in a recording apparatus. For the actuation of a record carrier in such a recording apparatus by spark break-down, the electrode set comprises a row of stationary, substantially wire-shaped electrode pins 1 which parallel and side by side in a common plane project freely from a common carrier 2. The recording on the record carrier is effected by the said carrier being moved past the row of stationary electrode pins 1 which are oriented at right angles to the direction of advance of the record carrier, the electrode pins being during this movement actuated selectively by means of control signals which are for example obtained from a decoder which is supplied with digital signal values obtained by an analog-to-digital conversion of an analog signal, the waveform of which it be desired to record on the record carrier.

The electrode set may comprise for example 274 electrode pins, only a small number of which are, however, for the sake of clearness shown in FIG. 1, which electrode pins are, in order to ensure a continuous recording of the signal waveform desired, located very closely to each other with spacings of e.g. 0.07 mm, and each pin may for example have a width of 0.3 mm.

In order that a sufficiently large cross-section of the individual electrode pins may be obtained so as to permit the supply of a suitable actuation voltage to produce the spark break-down desired and ensure the necessary rigidity of the electrode pins, the individual electrode pins have a thickness at right angles to the common plane, in which they are located, which is essentially larger than the spacing between the electrode pins. This thickness may for example equal the width of the electrode pins, that is to say e.g. 0.3 mm.

With a view to connecting control lines for the supply of the actuating signals, obtained for example from a decoder, for the selective actuation of the electrode pins, each of the electrode pins is moreover in accordance with the invention formed integral with a likewise wire-shaped connecting terminal having the same cross-section as the electrode pin, which connecting terminals project outwards from the side of the common carrier 2 opposite to the electrode pins and are bent alternately in different, mutually inclined directions, so that the smallest spacing between the extreme ends, designed for the mounting of the control lines, of the connecting terminals is essentially larger than the spacing between the electrode pins.

In the embodiment shown, this is realized by such a bending of the connecting terminals that the latter are located alternately in three mutually inclined planes, each of which is common to a part of the total number of connecting terminals. As appears from FIG. 1 and is shown more clearly in the enlarged illustrations in FIGS. 2 and 3, every third of the connecting terminals, in the figure designated by 3a, is in the embodiment shown bent obliquely upwardly in relation to the plane of the electrode pins, and every third of the connecting terminals, in the figure designated 3b, is bent downwardly in relation to the plane of the electrode pins, while the remaining connecting terminals, in the figure designated 3c, extend unchanged in the plane of the electrode pins. By this means, a sufficiently large spacing is obtained between the extreme ends of the connecting terminals, so that the control lines can be mounted without any difficulty without coming into conflict with each other.

An additionally improved separation between the extreme ends of the connecting terminals may be achieved by the connecting terminals located in the same plane having alternately different lengths reckoned from the common carrier 2, as shown in FIGS. 1 and 2.

In the production of the electrode set illustrated in FIGS. 1 to 3, the starting point is in accordance with the method proposed by the invention a number of plate-shaped blanks, in the present case three such blanks, of the electrode material which in itself should possess a comparatively great rigidity and e.g. may be stainless steel, each of which blanks has a thickness equal to the thickness required for the electrode pins in the finished electrode set, that is to say for example 0.3 mm. In FIG. 4, such a plate-shaped blank is as a whole designated by 4. Each of these blanks, in the present case three such blanks, is etched with a suitable etchant to produce a number of parallel wire-shaped electrode pins 1 which are surrounded by a common frame 5 and each of which comprises an associated, likewise wire-shaped connecting terminal 3 formed integral with the electrode pin, the spacings between the wire-shaped elements, each of which forms an electrode pin 1 with an associated connecting terminal 3, in each of these blanks 4 having a size which offers room for accommodating an electrode pin from each of the remaining blanks. In the present case, where the spacing required between the electrode pins in the finished electrode set is e.g. 0.07 mm, while the electrode pins have a width of 0.3 mm, it will consequently be obvious that each of the etched-out spacings in the plate-shaped blanks 4 must have a width of 0.81 mm. Since the dimensions mentioned above serve only as examples, it should be pointed out that the etched-out spacings in each of the blanks 4 out of regard to the etching operation must have a minimum width equal to the thickness of the blank.

After the etching, each of the plate-shaped blanks 4 thus treated minus one is bent at the same distance from the extreme ends of the electrode pins 1 along a bending line, which is at right angles to the electrode pins and indicated in dotted lines in FIG. 4, in different directions, and the surrounding frame 5 in each of the blanks 4 is removed at the side located at the extreme ends of the electrode pins. The etched and bent plate-shaped blanks 4 are now coupled together along the bending lines under a mutual parallel displacement of the blanks in the direction at right angles to the electrodes 1 in such a way that there will, as indicated above, in each spacing between adjacent pins in the same blank be accommodated an electrode pin from each of the remaining blanks in the same plane as said adjacent electrode pins and with a spacing between them corresponding to the spacing required for the finished electrode set. This interdigitation of the electrode pins 1 of the three blanks appears clearly from FIG. 2.

Subsequently to this, the common carrier 2 which, as shown in FIG. 1, may consist of two components screwed together is mounted parallel to the bending lines in the plate-shaped blanks, preferably on the side of these lines facing the electrode pins.

The electrode set is now finished in the form shown in FIG. 1, but in order that the extreme ends of the freely outwardly projecting electrode pins 1 may be stabilized with correct uniform spacings in a common plane, a suitable support of electrically insulating material may be applied to the electrode pins, which material keeps the electrode pins clear of each other.

FIGS. 5 and 6 show a tool for use in the above-mentioned coupling together of the bent and etched plate-shaped blanks 4. This extremely simple tool comprises a number of alternately similar plate-shaped elements having two different sizes of area, which elements are clamped together so as to be plane-parallel and of which the smaller elements 6 are located between the larger elements 7 and have a thickness corresponding to the required width, in this case 0.3 mm, of the electrode pins, while the larger elements 7, which project beyond the smaller elements 6, have a thickness corresponding to the spacing required between the electrode pins for the finished electrode set, in this case 0.07 mm. The plate-shaped elements 6 and 7 are mounted and clamped together on a common through bolt 8. When the plate-shaped blanks 4 in the embodiment in FIG. 1 are coupled together, the electrode pins 1 are inserted in each of these elements in every third of the spacings between the large elements 7 in the tool displaced in relation to the electrode pins in the two other blanks 4. The mounting in the tool is preferably carried out in the way that the bending lines in the plate-shaped blanks are located at some distance outside the tool to enable the common carrier 2 to be mounted while the electrode pins 1 are still located in the spacings of the tool.

When this operation has been carried out, the electrode pins are finished by removing the remaining parts of the surrounding frames 5 in the blanks 4 and the small spacers 9, which are shown in FIG. 4 and serve for achieving the difference in length, described above, between the connecting terminals 3 located in the same plane.

What we claim is:

1. A method for manufacturing an electrode set, in which a row of substantially wire-shaped electrode pins project freely from a common carrier parallel to each other and side by side in a common plane, said pins being connected to individual ones of a number of connecting terminals for control lines for the supply of actuating signals for the selective actuation of each electrode pin independently of the remaining electrodes, the thickness of the electrode pins at right angles to the common plane being substantially larger than the spacing between two electrode pins, and the connecting terminals being bent alternately in different directions, so that the spacing between mutually adjacent connecting terminals is larger than the spacing between mutually adjacent electrode pins, characterized in that a number of plate-shaped blanks of the electrode material and with a thickness corresponding to the thickness required of the electrode pins are etched so that each of them produces a number of parallel wire-shaped electrode pins surrounded by a common frame and each comprising its associated likewise wire-shaped connecting terminal which is integral with the electrode pin, the spacings between the electrode pins and the connecting terminals in each of the blanks being at least equal to the thickness of the blank and being so large that they offer room for accommodating an electrode pin from each of the other blanks, subsequently to which at least the total number minus one of the plate-shaped blanks thus etched are at the same distance from the extreme ends of the electrode pins bent in different directions along a bending line at right angles to the electrode pins, whereafter the surrounding frame in each of the plate-shaped blanks is removed at the side located at the extreme ends of the electrode pins, and the plate-shaped blanks are coupled together along the bending lines under mutual parallel displacement of the blanks in the direction at right angles to the electrode pins in such a way that each spacing between adjacent electrode pins in the same blank will accommodate an electrode pin from each of the remaining blanks in the same plane as said adjacent electrode pins and with spacings between them that are essentially smaller than the thickness of the electrode pins, and in that the common carrier is subsequently mounted parallel to the bending lines in the plate-shaped blanks, after which the remaining parts of the frames of these blanks are removed.

2. A method as claimed in claim 1, characterized in that the common carrier is mounted along the bending lines in the plate-shaped blanks on the side of these lines facing the electrode pins.

3. A method as claimed in claim 2, characterized in that the extreme ends of the freely outwardly projecting electrode pins are after the mounting of the carrier stabilized with correct uniform spacings in a common plane by means of a support of electrically insulating material.

* * * * *

UNITED STATES PATENT OFFICE
CERTIFICATE OF CORRECTION

PATENT NO. : 3,994,062
DATED : December 22, 1976
INVENTOR(S) : POUL BOELT CHRISTENSEN It is certified that error appears in the above-identified patent and that said Letters Patent are hereby corrected as shown below:

The name and address of the assignee are as follows:

[73] Assignee: DISA ELEKTRONIK A/S
(DANSK INDUSTRI SYNDIKAT A/S)

Mileparken, Skovlunde, Denmark

Signed and Sealed this

Fifth Day of April 1977

[SEAL]

Attest:

RUTH C. MASON
*Attesting Officer*

C. MARSHALL DANN
*Commissioner of Patents and Trademarks*